US012222968B2

(12) United States Patent
Hillborg et al.

(10) Patent No.: US 12,222,968 B2
(45) Date of Patent: Feb. 11, 2025

(54) DETECTING EMOTIONAL EVENTS IN TEXTUAL CONTENT

(71) Applicant: INTERNATIONAL BUSINESS MACHINES CORPORATION, Armonk, NY (US)

(72) Inventors: Mikael Hillborg, Urnea (SE); Linjing Fu, Stockholm (SE); Joshua Bello, London (GB); Aderinsola Okunoren, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/345,038

(22) Filed: Jun. 30, 2023

(65) Prior Publication Data

US 2025/0005044 A1 Jan. 2, 2025

(51) Int. Cl.
*G06F 16/00* (2019.01)
*G06F 16/28* (2019.01)
*G06F 16/35* (2019.01)
*G06F 18/24* (2023.01)
G06F 40/205 (2020.01)
G06F 40/289 (2020.01)

(52) U.S. Cl.
CPC ............ *G06F 16/285* (2019.01); *G06F 16/35* (2019.01); *G06F 18/24765* (2023.01); *G06F 40/205* (2020.01); *G06F 40/289* (2020.01)

(58) Field of Classification Search
CPC ............ G06F 18/24765; G06F 40/205; G06F 40/289; G06F 16/285; G06F 16/35; G06F 16/353; G06F 16/355
USPC ................................................ 707/600–899
See application file for complete search history.

(56) References Cited

U.S. PATENT DOCUMENTS

| 9,424,524 | B2 | 8/2016 | Dave et al. |
| 9,910,723 | B2 | 3/2018 | Buddhu et al. |
| 10,565,244 | B2 | 2/2020 | Kershaw et al. |
| 11,966,702 | B1 * | 4/2024 | Wilkinson ............ G06F 18/2415 |
| 2017/0052971 | A1 * | 2/2017 | Boyer ..................... G06F 16/345 |
| 2017/0308523 | A1 | 10/2017 | Wang et al. |
| 2019/0005027 | A1 * | 1/2019 | He ........................... G06F 40/35 |

(Continued)

FOREIGN PATENT DOCUMENTS

CN 112329472 A 2/2021

*Primary Examiner* — Michelle N Owyang
(74) *Attorney, Agent, or Firm* — Eric Chesley, Esq.; Rachel L. Pearlman, Esq.; Heslin Rothenberg Farley & Mesiti P.C.

(57) ABSTRACT

Computer implemented methods, systems, and computer program products include program code executing on a processor(s) that obtains text from a computing resources in a domain and segments it into sentences. The processor(s) identifies entities in each sentence. The processor(s) classifies each entity with a sentiment (a polarity). The processor(s) identifies, for each sentence, a given entity with a strongest sentiment. The processor(s) derives for each sentence, for each entity, emotions and classifies each emotion by assigning a polarity to each and scoring each. The processor(s) calculates, based on the (emotion) scores, a mean and a standard deviation from the mean. The processor(s) maps the given entity for each sentence to a strongest emotion for the given entity where the polarity of the strongest emotion is the same as the polarity of the strongest sentiment. The processor(s) determines if each strongest emotion is within the standard deviation from the mean.

18 Claims, 4 Drawing Sheets

(56) References Cited

U.S. PATENT DOCUMENTS

| | | |
|---|---|---|
| 2019/0349321 A1 | 11/2019 | Cai et al. |
| 2020/0089762 A1* | 3/2020 | Fox ........................ G06F 40/166 |
| 2020/0159826 A1* | 5/2020 | Lev Tov ................. G06F 40/35 |
| 2021/0150140 A1 | 5/2021 | Galitsky |
| 2023/0267322 A1* | 8/2023 | Hou ....................... G06F 40/205 |
| | | 706/15 |
| 2023/0289528 A1* | 9/2023 | Ma .......................... G06F 40/30 |
| 2024/0127297 A1* | 4/2024 | Chen ................. G06Q 30/0282 |

* cited by examiner

DETECTING EMOTIONAL EVENTS IN TEXTUAL CONTENT

BACKGROUND

The present invention relates generally to the field of textual analysis and in particular, enhancements in the field of natural language understanding (NLU).

NLU uses deep learning to extract meaning and metadata from unstructured text data. For example, NLU can be used to extract categories, classification, entities, keywords, sentiment, emotion, relations and/or syntax from text. NLU capabilities can be implemented as a machine learning system that can include a neural network (NN). NLU technologies can utilize supervised, semi-supervised, or unsupervised deep learning through a single- or multi-layer NN to classify data. The deep learning capabilities use the NN to identify and weight connections between data points. The use of deep learning, including in NLU, is understood as a form of artificial intelligence.

Artificial intelligence (AI) refers to intelligence exhibited by machines. Artificial intelligence (AI) research includes search and mathematical optimization, neural networks, and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided through the provision of a computer-implemented method for identifying key emotional content in a text. The method can include: obtaining, by one or more processors, the text from a computing resource in a domain; segmenting, by the one or more processors, the text into sentences; utilizing, by the one or more processors, pre-defined entities for the domain, to identify entities in each sentence of the sentences comprising the text; classifying, by the one or more processors, each entity of the identified entities with a sentiment and extracting the sentiments, where the classifying assigns a polarity to each sentiment of the sentiments; identifying, by the one or more processors, for each sentence, a given entity with a strongest sentiment, where the identifying comprises quantitively determining a value for each of the sentiments and utilizing the values to identify the strongest sentiment; deriving, by the one or more processors, for each sentence, for each entity, one or more emotions and classifying each emotion of the one or more emotions, where the classifying comprising: assigning a polarity to each emotion; and associating a score with each emotion to reflect a strength of each emotion within the polarity; calculating, by the one or more processors, for the one or more emotions in each sentence of the text, based on the scores, a mean and a standard deviation from the mean; mapping, by the one or more processors, the given entity for each sentence to a strongest emotion for the given entity, where the polarity of the strongest emotion for each given entity is the same as the polarity of the strongest sentiment for the given entity; and determining, by the one or more processors, for each strongest emotion, if the strongest emotion is within the standard deviation from the mean.

Additional aspects of the present disclosure are directed to systems and computer program products configured to perform the methods described above. Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
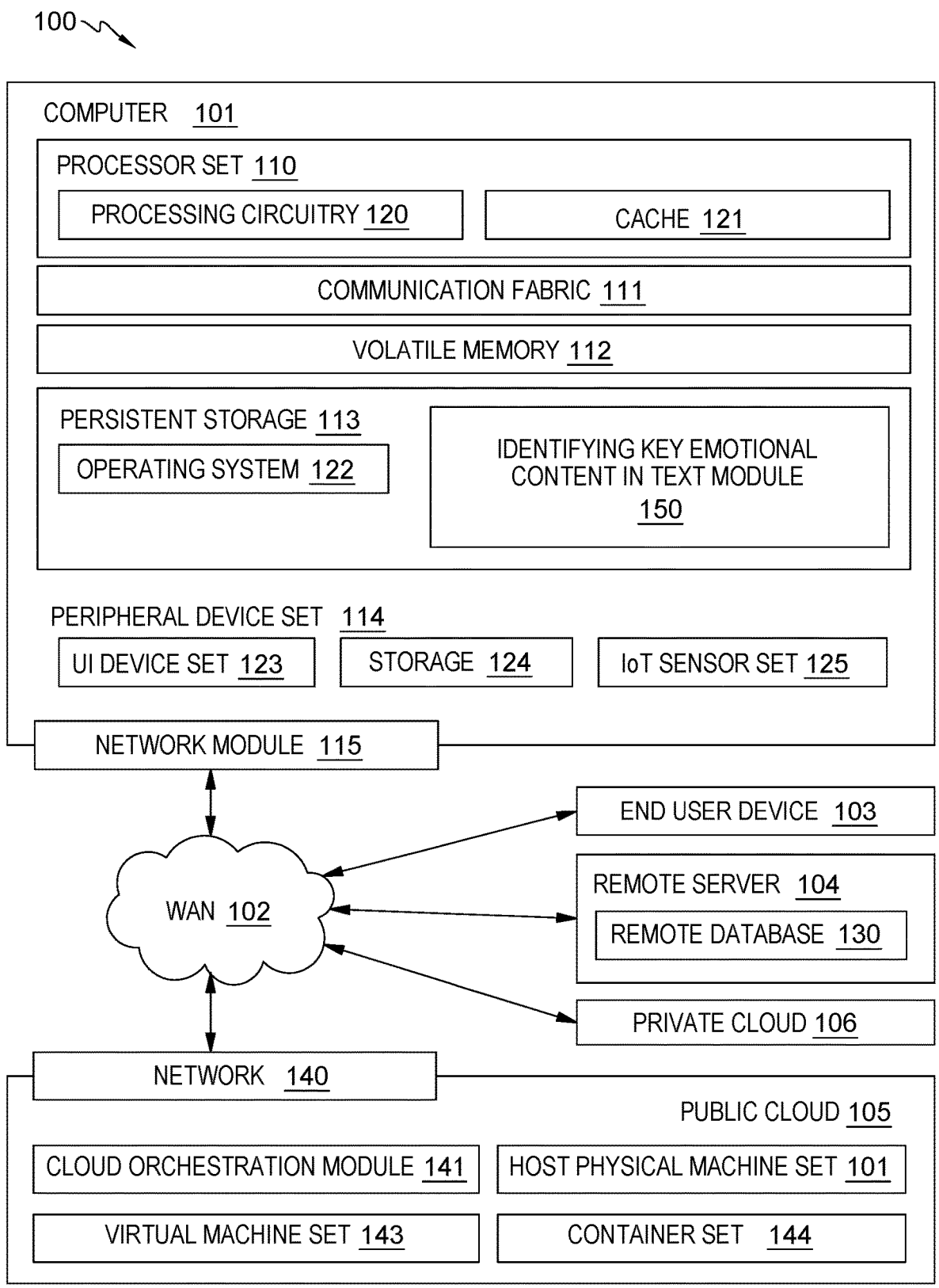
FIG. 1 depicts one example of a computing environment to perform, include and/or use one or more aspects of the present disclosure.

Embodiments of the present disclosure include computer-implemented methods, computer program products, and computer systems where program code executing on one or more processors identifies key emotional content in a text. Existing approaches to sentiment detection are deficient in reflecting a full range of emotion in a piece of text because these approaches are generally concerned with classifying the text as expressing a positive, neutral, or negative sentiment, sometimes on an individual sentence level. Meanwhile, existing approaches to classify emotion expressed in a whole of a piece of text or document and do not provide emotions expressed on a more granular level. For example, based on being trained with keywords, some existing approaches can classify a whole document as including one or more of the following emotions: anger, disgust, fear, joy, or sadness. A piece of text can include more than one emotion, including extraordinary moments. Existing automated textual analysis approaches, including NLU, cannot determine whether a given text, which may include, for example, includes content that is indicative of emotional events in the text regardless of an overall sentiment in the content. Unlike previous approaches, the program code in embodiments of the present disclosure can identify key emotional content in a piece of text. Thus, the program code in embodiments of the present disclosure can provide a comprehensive emotional analysis of a text while the existing approaches provide results to a user that fail to capture the true emotional landscape of a text. Embodiments of the present disclosure provide significantly more than these existing approaches by addressing this deficiency. In the examples herein, the program code can detect extraordinary moments in a textual sample and thus determine emotions throughout the text.

In some embodiments, the program code can utilize a sentiment for a particular entity to indicate/isolate/classify a single emotion, which is drawn from (e.g., three) sets, and the program code can build a distribution which reduces the number of outliers when the program code detects a pivotal event. Entities represent information in the user input that is relevant to the user's purpose. For example, when intents represent verbs (the action a user wants to do), entities represent nouns (the object of, or the context for, that action). In some existing NLU solutions, users can contribute to data utilized by NLU algorithms by providing text and identifying elements of the text as entities. Once defined, program code can locate these entities in other texts. As understood by one of skill in the art, an intent represents the purpose of a user's input. One can define an intent for each type of user request the application supports. An entity represents a term or object that is relevant to an intent and provides a specific context for an intent. In some examples herein, program code executing on one or more processors provides a multiple selection mechanisms that operates on entities to select a single three-pole sentiment among all entities and apply that sentiment on two sets of binary classified emotions together with a statistical metric that is based on an entire set of emotions in the text. Thus, the program code in these examples can identify a prevailing emotion in text. To determine a prevailing emotion or sentiment in text, in some examples, the program code detects key events in a piece of text by providing an additional dimension to more basic sentiment and emotion metrics. Additionally, to discover key events in text, which help the program code determine a prevailing emotion and/or sentiment, in some examples, the program code can incorporate one or more factors into its discovery processes, including but not limited to, selection mechanisms, classification of emotions, statistics, and/or entity extraction. The program code can be embodied (partially of fully) in an application programming interface (API). By using the API to interact with embodiments of the present disclosure, a user can provide a piece of text and receive an output which indicates moments of high emotional strength in general, regardless of sentiment and type of emotion.

Embodiments of the present disclosure provide significantly more than existing approaches to emotion and/or sentiment identification in text. Some existing approaches for discerning emotions in text by using a fact template obtained from a fact concept store and applying a fact estimator. This approach differs and is less effective than the examples herein in which program code utilizes a combination of entity extraction, sentiment analysis and emotion detection. Another existing approach analyzes text by performing spatial-temporal event grouping and event validation by writing to an event store, which also differs from the method discloses herein. Some existing approaches base sentiment analysis on a text similarity algorithm. Thus, this approach does not utilize emotion detection at all. The embodiments herein utilize a novel combination of sentiment and emotion detection that can be combined with entity extraction and statistics. To that end, only the examples disclosed herein can accurately recognize emotional events within the text and properly weight these events in the context of the emotions within the text.

In some examples, program code executing on one or more processors can utilize a sentiment for a particular entity to determine a single emotion, which the program code can draw from three sets. In this manner, the program code can generate a distribution which reduces outliers when the program code detects a pivotal event. Unlike in existing approaches, the program code in example herein utilizes sentiment as a selector from which of three sets to choose a single emotion. The program code utilizes the sentiment for a particular entity to indicate a single emotion, utilizes the single emotion to measure a statistical distribution, and utilizes the distribution to locate one or more pivotal events. Existing approaches, unlike certain of the examples herein, do not utilize a plurality of classified emotions rather than using the sentiment to represent emotions. In certain of the examples herein, the program code utilizes a sentiment (rather than extracting the sentiment) in an arrangement with other modules to locate pivotal events.

Not only do various aspects of the examples herein provide significantly more than existing approaches to classifying emotions in text, embodiments of the present disclosure are also inextricably tied to computing and are directed to a practical application. The examples described herein are inextricably linked to computing as the examples herein provide systems, methods, and computer program products that address a hard problem in artificial intelligence (AI), which is a computational problem that is relevant to computing technology. Embodiments of the present disclosure include technical enhancements to NLU (also referred to as natural-language interpretation (NLI)). NLU is considered a subtopic of natural language processing (NLP) and is inextricably linked to computing as it deals with machine reading comprehension. Specifically, an AI-hard problem, like NLU, which is improved through the examples herein, refers to a difficult computational problem (i.e., inextricably linked to computing) and the problem is difficult because it cannot be solved by a simple specific algorithm. AI-hard problems include computer vision, natural language understanding, and dealing with unexpected circumstances while solving real-world problems. Thus, the examples herein are directed to the practical application of providing an improvement to cognitive analysis of text, specifically, to correctly determine emotion(s) expressed in the text, which is an improvement in an area of computing. The examples herein are also directed to a practical question as evidenced by considerable commercial interest in the application of aspects of these examples to automated reasoning, machine translation, question answering, news-gathering, text categorization, voice-activation, archiving, and/or large-scale content analysis.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as a code block for identifying key emotional content in text 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction path that allow the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC)

connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation and/or review to an end user, this recommendation would typically be communicated from network module 115 of computer 101 through WAN 102 to EUD 103. In this way, EUD 103 can display, or otherwise present, the recommendation and/or review to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation and/or review based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network.

A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
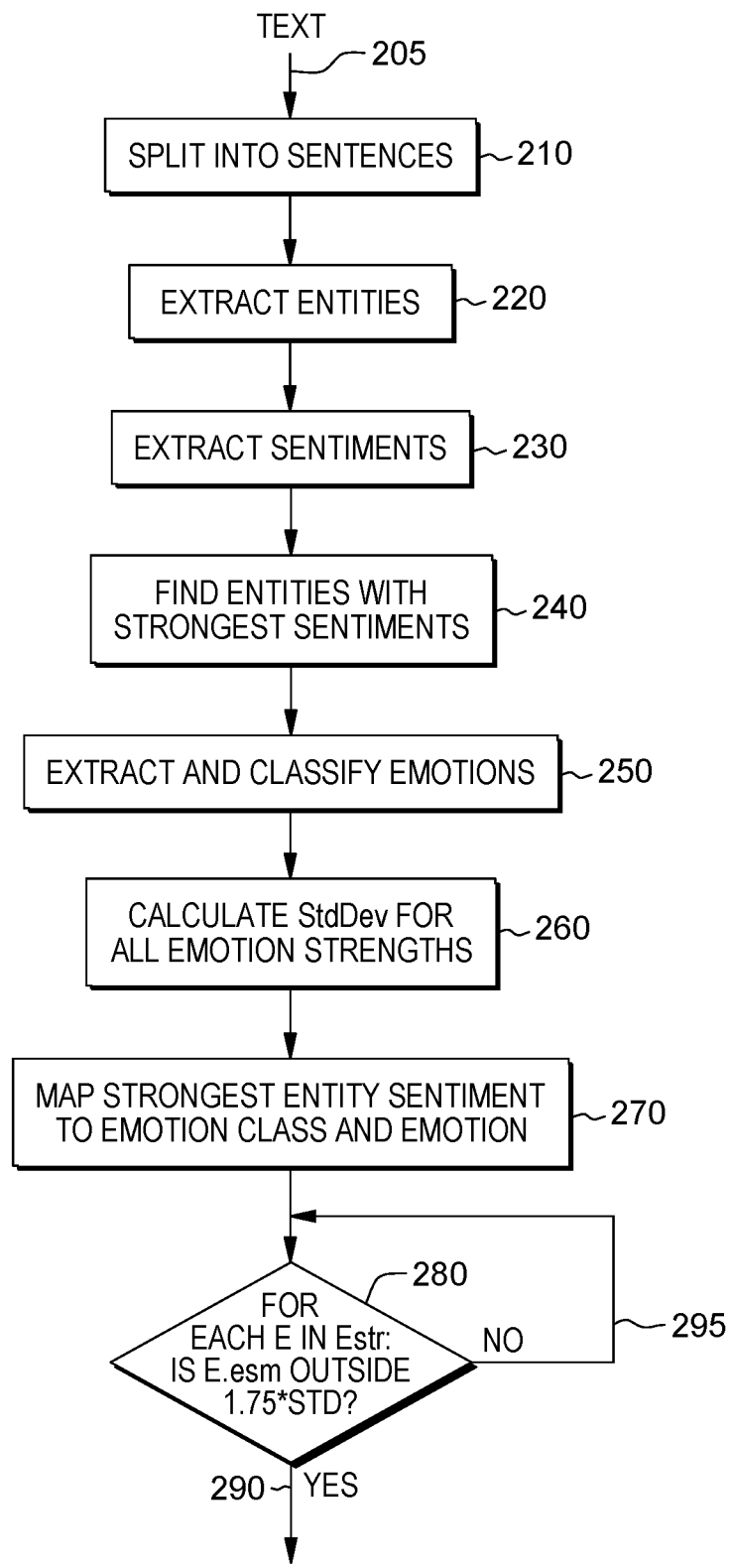
FIG. 2 is a workflow that provides an overview of various aspects performed by the program code (executing on one or more processors) in some embodiments of the present disclosure.

Embodiments of the present disclosure include computer-implemented methods, computer program products, and computer systems that, for example, extend the semantics of NLU solutions by providing a system of entity extractors, emotion detectors and sentiment analyzers that interact in a novel way to mark key emotional events in text. FIG. 2 is a workflow 200 that illustrates various aspects of some embodiments of the present disclosure. The program code obtains, as input, a text (205). The text is comprised of sentences and the program code analyzes elements of these sentence and specifically, the entities in the sentences. Entities provide the program code with additional context when receiving the text. Entities can be predefined to improve the prediction chances of an NLU model, including the mode utilized herein. An entity is an object of an action that a user wants to perform (the user could include the author of the text). The program code in embodiments of the present disclosure can interpret elements of the sentences of the text by matching entities to intent. The program code can also use the entities to gather additional data, and in these examples, as described in greater detail herein, to assess key emotions expressed in the text. A non-limiting and simplified example of program code utilizing entities in text in a general situation would be that upon receiving the text, "Please have a monitor delivered to my desk ASAP," the program code can utilize an intent, such as #SubmitARequest, to create a hardware request. The program code can then extract the entities, monitor and ASAP, to determine the type of hardware and urgency for the request. NLU entities fall into two categories: system and user-defined entities. In the examples herein, the program code can utilize both types of entities; however, these are entities pre-defined in advance of the workflow 200 illustrated in FIG. 2. System entities such as DATE, TIME, and LOCATION are available by default in your instance. Users can define additional entities to provide additional associations and meaning to words and/or phrases specific, including those specific to the type of text that the program code is analyzing. There are five types of user-defined entities, all of which can be utilized in embodiments of the present disclosure: simple (program code identifies these entities based on the context in which the entity is used in a text), mapped (program code identifies these entities based determining a source for the entity and utilizes the source to predict an intent), pattern (program codes can identify these entities utilizing regular expressions, examples of these entities would be phone numbers and addresses because they follow the same patterns), system-derived (program code can generate these custom entities from a default system entities such as date, time, duration, or location, for example, a start date and an end date, derived from a system date, would be examples of system-derived entities, and/or open-ended (program code identifies a word or phrase as open-ended and predicts the intent from the context that precedes or follows the entity in the text). In the workflow 200, the program code utilizes entities that were pre-defined for the domain (and hence relevant to performing NLU on the text). The entities can be stored on one or more databases or sources accessible to the one or more processors executing the program code.

Returning to FIG. 2, the program code splits the text into sentences (210) and utilizing the pre-defined entities for the domain, the program code extracts entities from the individual sentences (220). As noted above, the entities that the program code is extracting are pre-defined and possibility customized for the domain so each sentence can contain a set of entities of certain pre-defined entity types that play key roles for the domain. The program code classifies each entity with a single sentiment and extracts these sentiments (230). The program code can utilize an existing algorithm to classify the entities as sentiments. In some methods, a sentiment is a binary value, either positive or negative. Other methods can classify an entity's sentiment as positive, negative, or neutral. Some existing NLU algorithms can classify a sentiment as positive or negative but can also present an associated score. Thus, the program code, when utilizing this type of algorithm, can quantitatively determine a weight or strength of a given sentiment. Thus, the program code augments each sentence in the text with multiple sentiments on account of assigning a sentiment to each entity in each sentence. In some embodiments of the present disclosure, the program code classifies the sentiment of each entity as positive, negative, or neutral.

For each sentence, the program code determines which entity has the strongest sentiment (240). As aforementioned, the program code can utilize an existing NLU systems to identify and weight sentiments. One or more embodiments utilize, for instance, an IBM Watson® system as the cognitive agent in performing NLU. In one or more embodiments, the program code interfaces with IBM Watson Application Programming Interfaces (APIs) to perform a cognitive analysis, which includes NLU, of obtained data, in this case, of the entities. Specifically, in one or more embodiments, certain of the APIs of the IBM Watson API comprise a cognitive agent (e.g., learning agent) that includes one or more programs, including, but not limited to, natural language classifiers, Retrieve and Rank (i.e., a service available through the IBM Watson Developer Cloud™ that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank APIs, and trade off analytics APIs. In one or more embodiments of the present disclosure, the program code can utilize the deep learning in IBM Watson® Natural Language Understanding both to identify entities in the sentences, to determine a sentiment for each entity, and to assign a score to the sentiment (indicating the strength of the sentiment). IBM Watson® and IBM Watson Developer Cloud™ are registered trademarks or trademarks of International Business Machines Corporation in at least one jurisdiction. By selecting one and only one entity per sentence, where the entity holds the strongest sentiment (240), the program code reduces the dimensionality of entities.

The program code derives one or more emotions for each sentence and classifies these emotions as either positive or negative emotions (250). As discussed in reference to code determining which entity has the strongest sentiment (240), to derive the emotions, the program code can utilize an existing NLU product, algorithm, service, etc. One or more embodiments of the present disclosure can utilize NLU algorithms for deriving/detecting emotions that can include anger, disgust, fear, joy, and sadness. The program code (utilizing an algorithm) can assign a score to each emotion detected, for example, it can assign an emotion implied in text a score on a scale of 0 to 1; the score indicates the strength of an emotion. In this case, a score of 0 means the text does not convey the emotion, 1 indicates the text expresses the emotion strongly. To determine the emotion, the program code can analyze the overall emotional tone of the content (sentence) or it can analyze emotion conveyed by specific target phrases (which can be pre-defined). The program code can also derive emotions based on locating keywords in the text. One or more embodiments of the present disclosure can utilize IBM Watson® NLP to automatically classify text into the strongest emotions that are typically tracked: sadness, joy, anger, fear, and disgust. The program code can utilize these or other NLP algorithms or models to infer upon a certain emotion through syntax analysis by utilizing using pretrained and custom models. For example, the program code can assign a higher score to a given emotion (e.g., anger, fear, joy, sadness, analytical, confident, and tentative, etc.) based on the prevalence of keywords or phrases that indicate this emotion (in accordance with a pre-trained model and/or dataset). In some examples, the program code can assign a higher score to a given emotion based on a rating associated with the keyword that indicates the context of the emotion associated with the keyword or phrase and hence, the extremity of the emotion. The program code in embodiments of the present disclosure can determine a strength of an emotion (e.g., score) and, also, can determine whether an emotion is positive or negative.

Figure 3:
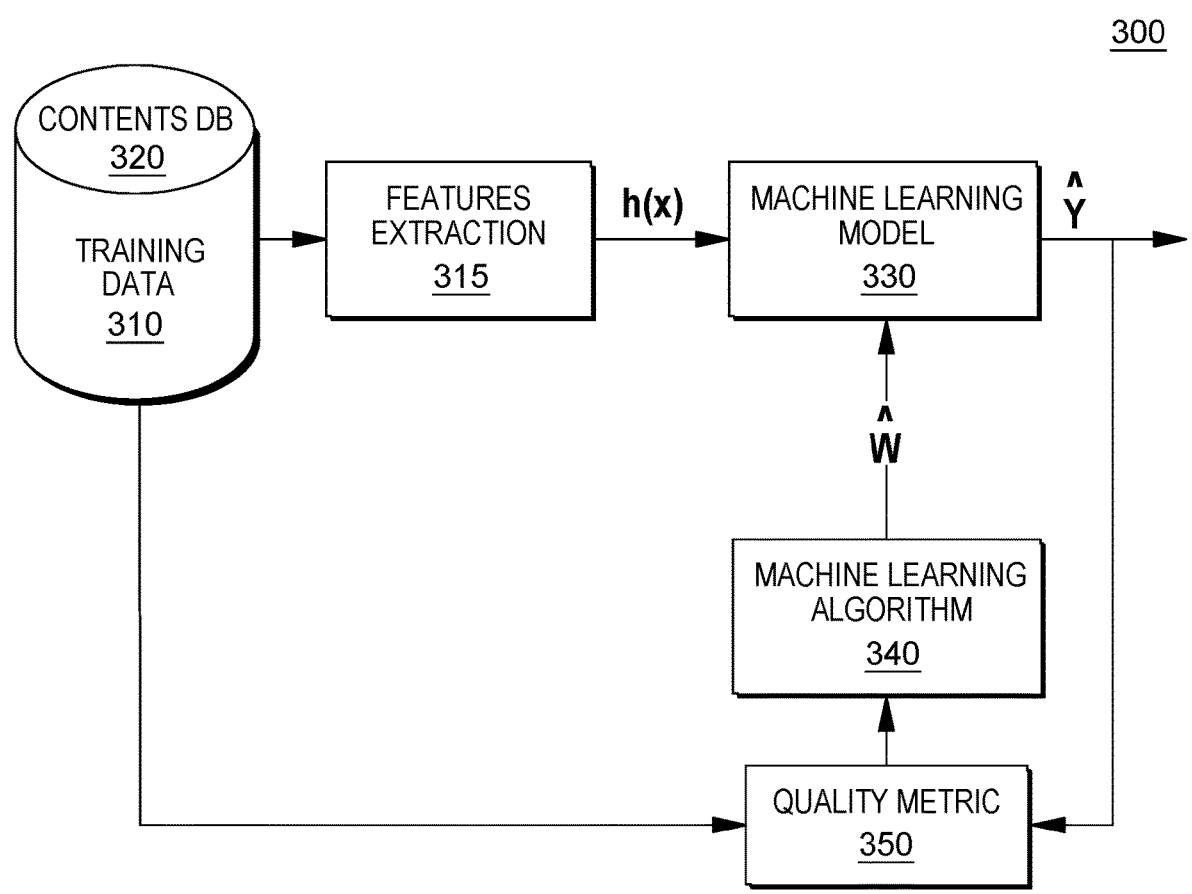
FIG. 3 is an example of a machine learning training system that can be utilized to perform cognitive analyses of the text to classify the emotions as either positive or negative emotions in embodiments of the present invention.

FIG. 3 is an example of a machine learning training system 300 that can be utilized to perform cognitive analyses of the text to classify the emotions as either positive or negative emotions (e.g., FIG. 2, 250). The program code in embodiments of the present disclosure, can identify various features/attributes (e.g., patterns) in the training data 310, the program code can utilize various techniques including, but not limited to, mutual information, which is an example of a method that can be utilized to identify features in an embodiment of the present disclosure. Further embodiments of the present disclosure utilize varying techniques to select features (elements, patterns, attributes, etc.), including but not limited to, diffusion mapping, principal component analysis, recursive feature elimination (a brute force approach to selecting features), and/or a Random Forest, to select the features. The program code can utilize a machine learning algorithm 340 to train the machine learning model 330 (e.g., the algorithms utilized by the program code), including providing weights for the conclusions, so that the program code can identify and classify emotions in the text, in accordance with the predictor functions that comprise the machine learning model 330. The conclusions can be evaluated by a quality metric 350. Through cognitive analysis, the program code can predict: 1) keywords and/or phrases in text that are indicative of various emotions (e.g., from a given set) applications and/or websites users typically link together; and/or 2) whether the emotions are positive or negative.

Returning to FIG. 2, for the emotion strengths in all the sentences, the program code calculates a mean and standard deviation from the mean (260). In these examples, whether an emotion is positive or negative is considered an emotion class. The program code maps a strongest entity sentiment (e.g., for each sentence) to emotion class and emotion (270). In making this mapping, the program code selects an emotion for the emotion class in the entity that has the strongest sentiment, with respect to the polarity of the 3-pole sentiment (e.g., the poles being positive, negative, and neutral). If the sentiment is positive, the program code selects the emotion with the strength of the strongest emotion in the same entity from the class of positive emotions. If the sentiment is negative, the program code selects the emotion with the strength of the strongest emotion from the same entity from the class of negative emotions. If the sentiment is neutral, the program code selects the emotion with the strength of the strongest emotion among all emotions in that entity.

For each of the emotions selected, the program code determines whether the emotion is within the standard deviation from the mean (280). If the emotion is within the standard deviation from the mean, the program code saves this emotion (290). The saved emotions can become the output the program code provides to the user. If the emotion is not within the standard deviation, the program code moves to evaluate the next emotion (295). Thus, the program code utilizes a sentiment for each entity (one entity per sentence) to determine a single emotion, drawn from three sets of emotions (e.g., based on the positive, negative, and neutral sentiments mapped to the emotions). The program code can utilize the saved emotions to generate a distribution. The emotions outside of the standard deviation would be outliers and hence, the program code can build a distribution which reduces the number of outliers, detecting pivotal events.

In embodiments of the present disclosure, as illustrated in FIG. 2, the program code analyzes each sentence (210 and 220) and identifies a single sentiment for each entity (230). The program code can also identify emotions. In some examples, the program code can extract two sets of emotions from the same entities by performing a binary classification of the emotions (250). The program code derives a statistical metric based on the strength among all detected emotions regardless of class. In some examples, the program code then uses a polarity of the sentiment (positive, negative, or neutral) to select an emotion from one of the two sets of emotions. The examples herein can identify key emotional content in a piece of text. Although it has been previously possible to measure sentiments and emotions, the program code improved significantly on this functionality by indicating the sentiments and emotions that indicate extraordinary moments. Thus, the program code detects key events in a piece of text by providing an additional dimension to the more basic sentiment and emotion metrics. As illustrated in FIG. 2, the program code incorporates factors, including but not limited to, selection mechanisms, classification of emotions, statistics, and/or entity extraction to discover key events in text.

Figure 4:
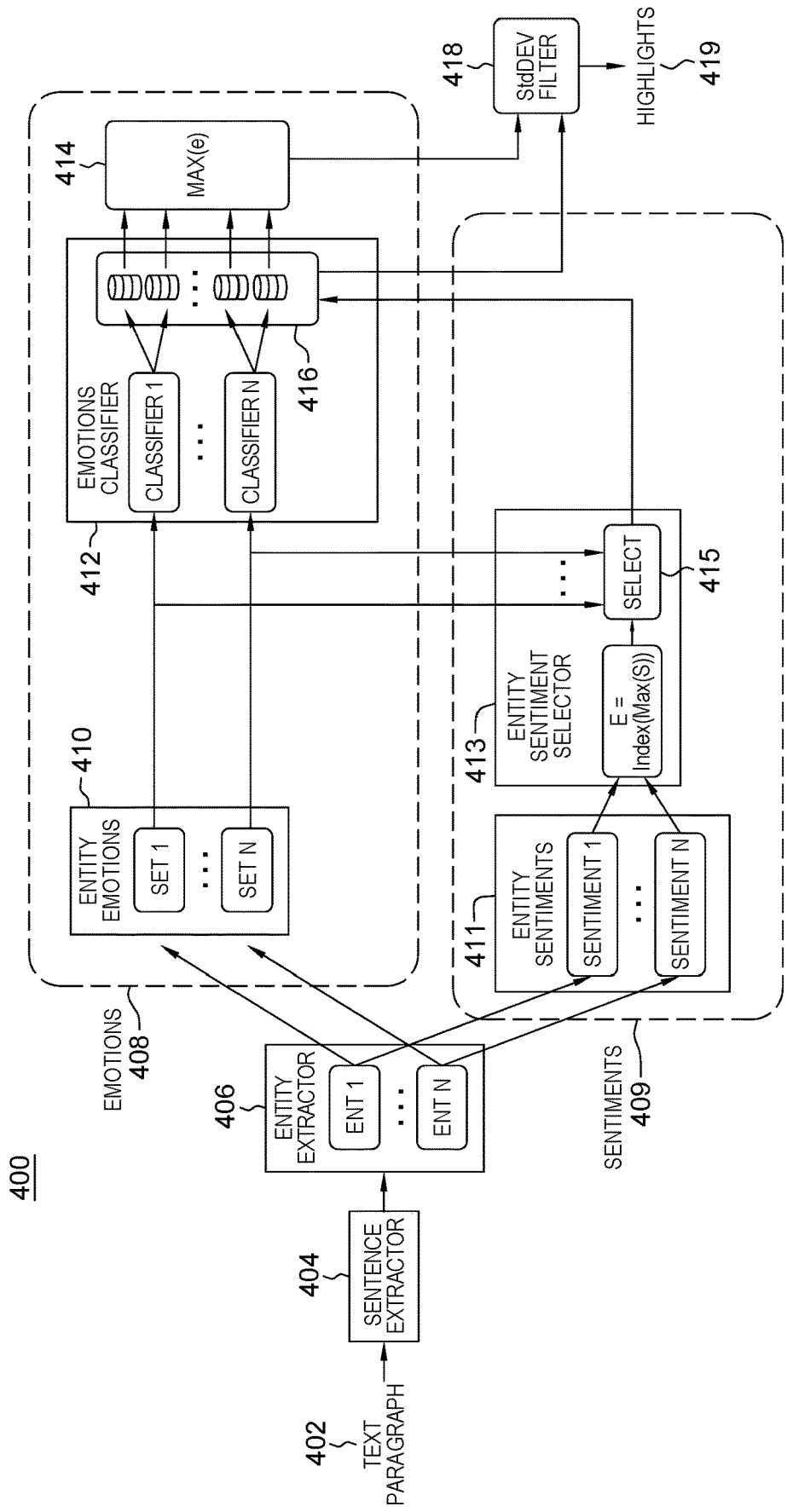
FIG. 4 provides a view of functionality of various aspects of the embodiments described herein.

FIG. 4 provides a high level view 400 of the functionality of various aspects of the embodiments described herein. In this example, for ease of understanding and not to impose any structural limitations, the program code is separated into modules to performs various functionalities in the illustrated workflow. This modular view is provided for illustrative purposes only as certain functionalities can be in individual and/or shared modules in various embodiments of the present disclosure. As illustrated in FIG. 4, program code executing on one or more processors receives, as input, text, in this example, a text paragraph 402. Program code comprising a sentence extractor 404 extract, separates, and/or identifies the sentences in the text paragraph 402. Program code comprising an entity extractor 406, identifies and/or extracts entities ENT1-ENTN from each sentence. The program code extracts emotions 408 as well as sentiments 409. These aspects can be accomplished sequentially (which extraction occurs first can vary) or in parallel. In determining the sentiments (e.g., sentiment 1-sentiment n), program code in a module referred to in FIG. 4 as entity sentiments 411 classifies each entity with a single sentiment and extracts these sentiments. The program code can utilize an existing algorithm to classify the entities as sentiments. Program code comprising an entity sentiment selector 413 selects the entity in the sentence with the strongest sentiment (e.g., E=Index(Max(S)) 415. As aforementioned, the program code labelled as entity emotions 410 in this example derives emotions 410 (Set 1-Set N) for each entity and program code comprising an emotions classifier 412 classifies each of these emotions as either positive or negative emotions (e.g., Classifier 1-Classifier N). In some examples, the program code extracts two sets of emotions from the same entities by performing a binary classification of the emotions (e.g., the program code can classify emotions as either positive or negative). The program code can derive a statistical metric based on the strength among all emotions detected by the program code regardless of class. The polarity of the sentiment is used to select an emotion 414 (max(e)) from one of the two sets of emotions 416, according to a specific scheme. For the emotions 416 in the sentences, the program code calculates a mean and standard deviation from the mean to utilize as a filter 418. For each of the emotions 414 selected, the program code applied the filter 418 to determine whether the emotion is within the standard deviation from the mean. If the emotion is within the standard deviation from the mean, the program code saves this emotion as a highlight 419. These highlights 419 can become the output the program code provides to the user.

Embodiments of the present disclosure include computer-implemented methods, computer systems, and computer program products that include program code executing on one or more processors that obtains the text from a computing resource in a domain. The program code segments the text into sentences. The program code utilizes pre-defined entities for the domain, to identify entities in each sentence of the sentences comprising the text. The program code classifies each entity of the identified entities with a sentiment and extracts the sentiments. When the program code classifies the sentiments, it assigns a polarity to each sentiment of the sentiments. The program code identifies for each sentence, a given entity with a strongest sentiment by quantitively determining a value for each of the sentiments and utilizing the values to identify the strongest sentiment. The program code derives, for each entity, one or more emotions and classifies each emotion of the one or more emotions. To classify each emotion, the program code assigns a polarity to each emotion. The program code associates a score with each emotion to reflect a strength of each emotion within the polarity. The program code calculates, for the one or more emotions in each sentence of the text, based on the scores, a mean and a standard deviation from the mean. The program code maps the given entity for each sentence to a strongest emotion for the given entity. The polarity of the strongest emotion for each given entity is the same as the polarity of the strongest sentiment for the given entity. The program code determines, for each strongest emotion, if the strongest emotion is within the standard deviation from the mean.

In some examples, based on determining that a strongest emotion of the strongest emotions is within the standard deviation from the mean, the program code retains the strongest emotion.

In some examples, the program code provides a visualization of the strongest emotion as output to indicate a key emotional content in the text.

In some examples, the program code determined, for each strongest emotion, if the strongest emotion is within the standard deviation from the mean by: evaluating each strongest emotion for each sentence sequentially and retaining each strongest emotion within the standard deviation from the mean.

In some examples, the program code generates a model representing each strongest emotion within the standard deviation from the mean. The program code can provide the model as output, wherein the output indicates key emotional content in the text.

In some examples, the pre-defined entities for the domain are retained in a memory accessible to the one or more processors and each pre-defined entity represents a key role in the domain.

In some examples, the polarity of each sentiment and the polarity of each emotion is selected from the group consisting of: positive and negative.

In some examples, the polarity of each sentiment and the polarity of each emotion is selected from the group consisting of: positive, neutral, and negative.

In some examples, each emotion of the one or more emotions is selected from the group consisting of: anger, disgust, fear, joy, and sadness.

In some examples, the score associated with each emotion is from 0 to 1.

In some examples, mapping the given entity for each sentence comprises, for each given entity by determining that the strongest sentiment for the given entity is positive and mapping the given entity to a strongest positive emotion for the given entity.

In some examples, mapping the given entity for each sentence comprises, for each given entity by determining that the strongest sentiment for the given entity is negative, and mapping the given entity to a strongest negative emotion for the given entity.

In some examples, mapping the given entity for each sentence comprises, for each given entity by determining that the strongest sentiment for the given entity is neutral and mapping the given entity to a strongest emotion for the given entity.

Although various embodiments are described above, these are only examples. For example, reference architectures of many disciplines may be considered, as well as other knowledge-based types of code repositories, etc., may be considered. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of identifying key emotional content in a text, the method comprising:
   obtaining, by one or more processors, the text from a computing resource in a domain;
   segmenting, by the one or more processors, the text into sentences;
   utilizing, by the one or more processors, pre-defined entities for the domain, to identify entities in each sentence of the sentences comprising the text;
   classifying, by the one or more processors, each entity of the identified entities with a sentiment and extracting the sentiments, wherein the classifying assigns a polarity to each sentiment of the sentiments;
   identifying, by the one or more processors, for each sentence, a given entity with a strongest sentiment, wherein the identifying comprises quantitively determining a value for each of the sentiments and utilizing the values to identify the strongest sentiment;
   deriving, by the one or more processors, for each sentence, for each entity, one or more emotions and classifying each emotion of the one or more emotions, wherein the classifying comprising:
      assigning a polarity to each emotion; and
      associating a score with each emotion to reflect a strength of each emotion within the polarity;
   calculating, by the one or more processors, for the one or more emotions in each sentence of the text, based on the scores, a mean and a standard deviation from the mean;
   mapping, by the one or more processors, the given entity for each sentence to a strongest emotion for the given entity, wherein the polarity of the strongest emotion for each given entity is the same as the polarity of the strongest sentiment for the given entity; determining, by the one or more processors, for each strongest emotion, if the strongest emotion is within the standard deviation from the mean; and
   based on determining that a strongest emotion of the strongest emotions is within the standard deviation from the mean, retaining the strongest emotion.

2. The method of claim 1, further comprising:
   providing, by the one or more processors, a visualization of the strongest emotion as output to indicate a key emotional content in the text.

3. The method of claim 1, wherein the determining, for each strongest emotion, if the strongest emotion is within the standard deviation from the mean comprises:
   evaluating, by the one or more processors, each strongest emotion for each sentence sequentially; and
   retaining, by the one or more processors, each strongest emotion within the standard deviation from the mean.

4. The method of claim 3, further comprising:
   generating, by the one or more processors, a model representing of each strongest emotion within the standard deviation from the mean; and
   providing, by the one or more processors, the model as output, wherein the output indicates key emotional content in the text.

5. The method of claim 1, wherein the pre-defined entities for the domain are retained in a memory accessible to the one or more processors, and wherein each pre-defined entity represents a key role in the domain.

6. The method of claim 1, wherein the polarity of each sentiment and the polarity of each emotion is selected from the group consisting of: positive and negative.

7. The method of claim 1, wherein the polarity of each sentiment and the polarity of each emotion is selected from the group consisting of: positive, neutral, and negative.

8. The method of claim 1, wherein each emotion of the one or more emotions is selected from the group consisting of: anger, disgust, fear, joy, and sadness.

9. The method of claim 1, wherein the score associated with each emotion is from 0 to 1.

10. The method of claim 7, wherein mapping the given entity for each sentence comprises, for each given entity:
    determining, by the one or more processors, that the strongest sentiment for the given entity is positive; and
    mapping the given entity to a strongest positive emotion for the given entity.

11. The method of claim 7, wherein mapping the given entity for each sentence comprises, for each given entity:
    determining, by the one or more processors, that the strongest sentiment for the given entity is negative; and
    mapping the given entity to a strongest negative emotion for the given entity.

12. The method of claim 7, wherein mapping the given entity for each sentence comprises, for each given entity:
    determining, by the one or more processors, that the strongest sentiment for the given entity is neutral; and
    mapping the given entity to a strongest emotion for the given entity.

13. A computer system for determining resource dispositions for identifying key emotional content in a text, the computer system comprising:
    a memory; and
    one or more processors in communication with the memory, wherein the computer system is configured to perform a method, said method comprising:
       obtaining, by the one or more processors, the text from a computing resource in a domain;
       segmenting, by the one or more processors, the text into sentences;
       utilizing, by the one or more processors, pre-defined entities for the domain, to identify entities in each sentence of the sentences comprising the text;
       classifying, by the one or more processors, each entity of the identified entities with a sentiment and extracting the sentiments, wherein the classifying assigns a polarity to each sentiment of the sentiments;
       identifying, by the one or more processors, for each sentence, a given entity with a strongest sentiment, wherein the identifying comprises quantitively determining a value for each of the sentiments and utilizing the values to identify the strongest sentiment;
       deriving, by the one or more processors, for each sentence, for each entity, one or more emotions and classifying each emotion of the one or more emotions, wherein the classifying comprising:
assigning a polarity to each emotion; and
associating a score with each emotion to reflect a strength of each emotion within the polarity;
calculating, by the one or more processors, for the one or more emotions in each sentence of the text, based on the scores, a mean and a standard deviation from the mean;
mapping, by the one or more processors, the given entity for each sentence to a strongest emotion for the given entity, wherein the polarity of the strongest emotion for each given entity is the same as the polarity of the strongest sentiment for the given entity;
determining, by the one or more processors, for each strongest emotion, if the strongest emotion is within the standard deviation from the mean; and
based on determining that a strongest emotion of the strongest emotions is within the standard deviation from the mean, retaining the strongest emotion.

14. The computer system of claim 13, further comprising:
providing, by the one or more processors, a visualization of the strongest emotion as output to indicate a key emotional content in the text.

15. The computer system of claim 13, wherein the determining, for each strongest emotion, if the strongest emotion is within the standard deviation from the mean comprises:
evaluating, by the one or more processors, each strongest emotion for each sentence sequentially; and
retaining, by the one or more processors, each strongest emotion within the standard deviation from the mean.

16. The computer system of claim 15, further comprising:
generating, by the one or more processors, a model representing of each strongest emotion within the standard deviation from the mean; and
providing, by the one or more processors, the model as output, wherein the output indicates key emotional content in the text.

17. The computer system of claim 13, wherein the pre-defined entities for the domain are retained in a storage device accessible to the one or more processors, and wherein each pre-defined entity represents a key role in the domain.

18. A computer program product for identifying key emotional content in a text, the computer program product comprising:
one or more computer readable storage media and program instructions collectively stored on the one or more computer readable storage media readable by at least one processing circuit to:
obtain, by the one or more processors, the text from a computing resource in a domain;
segment, by the one or more processors, the text into sentences;
utilize, by the one or more processors, pre-defined entities for the domain, to identify entities in each sentence of the sentences comprising the text;
classify, by the one or more processors, each entity of the identified entities with a sentiment and extracting the sentiments, wherein the classifying assigns a polarity to each sentiment of the sentiments;
identify, by the one or more processors, for each sentence, a given entity with a strongest sentiment, wherein the identifying comprises quantitively determining a value for each of the sentiments and utilizing the values to identify the strongest sentiment;
derive, by the one or more processors, for each sentence, for each entity, one or more emotions and classifying each emotion of the one or more emotions, wherein the classifying comprising:
assign a polarity to each emotion; and
associate a score with each emotion to reflect a strength of each emotion within the polarity;
calculate, by the one or more processors, for the one or more emotions in each sentence of the text, based on the scores, a mean and a standard deviation from the mean;
map, by the one or more processors, the given entity for each sentence to a strongest emotion for the given entity, wherein the polarity of the strongest emotion for each given entity is the same as the polarity of the strongest sentiment for the given entity;
determine, by the one or more processors, for each strongest emotion, if the strongest emotion is within the standard deviation from the mean; and
based on determining that a strongest emotion of the strongest emotions is within the standard deviation from the mean, retain the strongest emotion.

* * * * *